(12) United States Patent
Fegan et al.

(10) Patent No.: US 8,068,847 B1
(45) Date of Patent: Nov. 29, 2011

(54) METHOD AND APPARATUS FOR NOTIFYING A USER OF SEPARATION FROM A MOBILE DEVICE

(75) Inventors: Chris Fegan, Darlington (AU);
Katherine Hamilton, Sydney (AU);
Neil Hepworth, Artarmon (AU);
Lawrence Ongud Opiyo, Cordeaux Heights (AU)

(73) Assignee: Avaya Inc., Basking Ridge, NJ (US)

( * ) Notice: Subject to any disclaimer, the term of this patent is extended or adjusted under 35 U.S.C. 154(b) by 269 days.

(21) Appl. No.: 11/463,523

(22) Filed: Aug. 9, 2006

(51) Int. Cl.
*H04W 24/00* (2009.01)
*H04M 3/42* (2006.01)
*H04B 1/06* (2006.01)
*G06F 15/16* (2006.01)
*G01C 21/00* (2006.01)

(52) U.S. Cl. ............. 455/456.1; 455/414; 455/266; 709/204; 701/207

(58) Field of Classification Search .......... 455/456.1, 455/423, 67.12, 550.1, 456.3; 370/223; 340/571, 340/539, 425.5, 426, 505; 342/457; 709/223, 709/224, 204, 245; 701/207, 214
See application file for complete search history.

(56) References Cited

U.S. PATENT DOCUMENTS

| | | | |
|---|---|---|---|
| 5,223,844 A | 6/1993 | Mansell et al. | |
| 6,226,589 B1 * | 5/2001 | Maeda et al. | 701/207 |
| 6,385,454 B1 | 5/2002 | Bahl et al. | |
| 6,618,593 B1 * | 9/2003 | Drutman et al. | 455/456.3 |
| 7,016,707 B2 | 3/2006 | Fujisawa et al. | |
| 7,079,945 B1 | 7/2006 | Kaplan | |
| 7,373,144 B1 | 5/2008 | Kirkpatrick et al. | |
| 7,653,715 B2 * | 1/2010 | Bobde et al. | 709/223 |
| 2002/0120687 A1 * | 8/2002 | Diacakis et al. | 709/204 |
| 2004/0066295 A1 * | 4/2004 | Fellenstein et al. | 340/568.1 |
| 2004/0180673 A1 | 9/2004 | Adams et al. | |
| 2004/0193725 A1 * | 9/2004 | Costa-Requena et al. | 709/238 |
| 2004/0243307 A1 | 12/2004 | Geelen | |
| 2005/0054339 A1 | 3/2005 | Merritt | |
| 2005/0075116 A1 * | 4/2005 | Laird et al. | 455/456.3 |
| 2005/0085257 A1 * | 4/2005 | Laird et al. | 455/550.1 |
| 2005/0136912 A1 * | 6/2005 | Curatolo et al. | 455/423 |
| 2006/0068731 A1 | 3/2006 | Seier | |
| 2006/0120281 A1 * | 6/2006 | Schmidt et al. | 370/223 |

FOREIGN PATENT DOCUMENTS

EP 01521421 4/2005

OTHER PUBLICATIONS

U.S. Appl. No. 11/257,909, filed Oct. 24, 2005, Barrett et al.
Braden, R., et al; RFC 2205: Resource ReSerVation Protocol (RSVP)—Version 1 Functional Specification; Internet RFC/STD/FYI/BCP Archives; Internet Web Site: http://www.faqs.org/rfcs/rfc2205.html; 79 pages; Sep. 1997.
Tehrani "Presence Meets the Cell Phone Thanks to Orative", available at http://www.tmcnet.com/tmcnet/columns/2004/072304rt.htm, Jul. 23, 2003, pp. 1-4.

(Continued)

*Primary Examiner* — Lester Kincaid
*Assistant Examiner* — Kuo Woo
(74) *Attorney, Agent, or Firm* — Sheridan Ross P.C.

(57) ABSTRACT

Disclosed herein is a system and method for notifying a person that they have become separated from their mobile communication device. A comparison between location information for the device and presence information for the person is used to determine whether or not a separation exists. Certain corrective actions are possible in order to mitigate the consequences of the separation. A separation may be allowed to exist within a certain maximum allowable distance of separation without the system or method notifying the person.

20 Claims, 3 Drawing Sheets

OTHER PUBLICATIONS

"Whereis—About", available at http://www.whereis.com/products/about-whereis/, printed Sep. 29, 2008, pp. 1-2.

"Whereis—On your mobile", available at http://www.whereis.com/products/on-your-mobile/, printed Sep. 29, 2008, pp. 1-4.

* cited by examiner

METHOD AND APPARATUS FOR NOTIFYING A USER OF SEPARATION FROM A MOBILE DEVICE

FIELD

Notification to users of separation from mobile devices based on device location and user presence information.

BACKGROUND OF THE INVENTION

Mobile devices such as cellular telephones, personal digital assistants, and laptop computers are widely used for the many benefits they provide. The portability of these devices allows a person greater levels of connectivity. A cellular telephone, for example, can be carried allowing a person to send and receive telephone calls. A personal digital assistant can be used to send and receive email or instant messages. A laptop can be used at a wireless hot spot to send and receive electronic communications such as instant messages and email.

These devices, while providing the convenience of mobile communication, can be lost, stolen or forgotten. For instance, a person may leave a cellular phone behind when leaving the house or a laptop computer may be stolen. In some instances a person may not realize that they have become separated from their mobile device. As a result, communications directed to the device can be missed, resulting in perhaps a loss of productivity or missed opportunities.

Prior art solutions to the problem of being separated from a mobile communication device include periodically calling a voice mail box to check for messages or traveling back to the last known location of the mobile device. These solutions can be an inconvenience, as they may involve unwanted travel and time commitments. In addition, these prior art solutions do not provide an indication that a person has become separated from a mobile device. Accordingly, it would be desirable for a person to be automatically notified that he or she has become separated from his or her phone or other communication device and possibly to be provided with options for taking corrective actions that mitigate the consequences of the separation.

SUMMARY

The present invention is directed to solving these and other problems and disadvantages of the prior art. According to embodiments of the present invention, a system and method are provided that notify a user or a person that he or she has become separated from his or her mobile device. A presence detection application, a wireless device location determining application, and a notification application are used to achieve aspects of the notification system and method. The applications or parts of the applications may be running on a system within the mobile device and/or on a system separate from the mobile device.

In accordance with embodiments of the present invention, a location determining application is used to acquire location information for the mobile device. The location determining application can acquire the location information from a variety of possible sources including a wireless network associated with the mobile device, a global positioning system, or other sources.

In accordance with embodiments of the present invention, a presence detection application is used to acquire presence information regarding the user of the mobile device. Presence information can include or be derived from the approximate location of a person or device. Additionally, presence information can include the availability of a person or the preferred method of contacting a person.

In accordance with embodiments of the present invention, a notification application uses the location information related to the mobile device and the presence information associated with a person to determine if the person has been separated from his or her or mobile communication device. If such a separation exists, the notification application proceeds to notify the person. Additionally, separation may be allowed to exist within a predetermined maximum separation distance before the notification application proceeds to notify the person.

In accordance with embodiments of the present invention, a notification may take place by means of an electronic communication sent to a secondary communication device associated with the person. Additionally, the notification may include a prompt requesting information from the person regarding the reason for the separation. In response to information provided by the person, the notification may proceed to take such corrective actions as redirecting communications to an alternative communication device or reporting the device as stolen.

DETAILED DESCRIPTION

Figure 1:
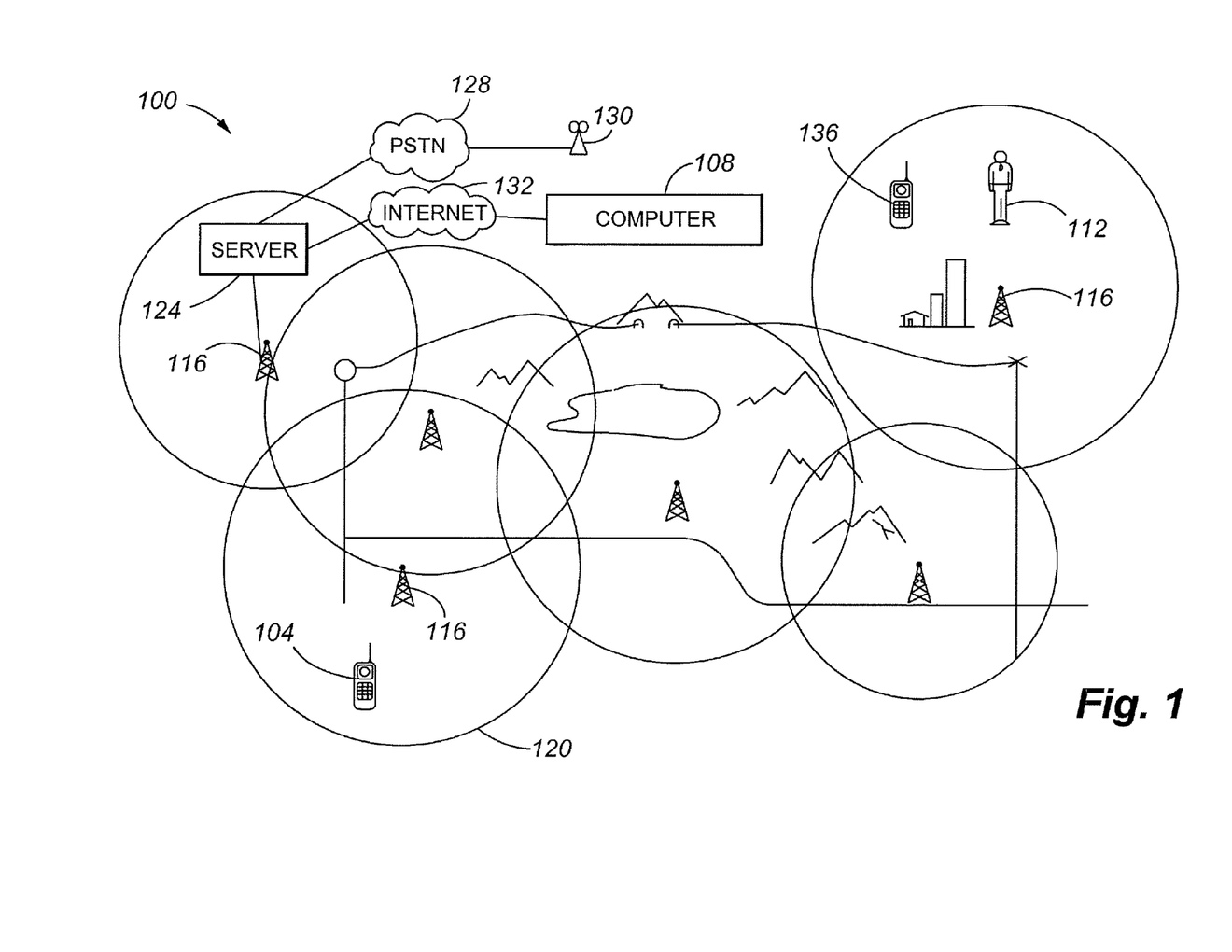
FIG. 1 is a schematic depiction of components and features of a notification system in accordance with embodiments of the present invention.

With reference now to FIG. 1, components and features of a notification system 100 in accordance with the embodiments of the present invention are illustrated. In general, the notification system 100 includes a first mobile communication device 104 and a first general-purpose computer 108 capable of running one or more applications. The first mobile communication device 104, by way of example and not limitation, can be a cellular telephone, a personal digital assistant, a laptop computer used in conjunction with a wireless hotspot, or any device that employs the use of cellular technology. Additionally, FIG. 1 includes a person or user 112 of the mobile communication device 104 shown as being separated from the mobile communication device 104. As can be appreciated from the discussion provided herein, the user 112 and the mobile communication device 104 may have become separated for various reasons, including the device 104 having been inadvertently left behind or the device 104 having been stolen.

The first mobile communication device 104 is capable of wireless communication with a base station 116, while the mobile communication device 104 is in a wireless communication cell 120. While only one mobile communication device 104 is illustrated in FIG. 1, it can be appreciated that a typical notification system 100 may operate in connection with a number of mobile communication devices 104. As can be appreciated by one of skill in the art from the description provided herein, the base station 116 and the mobile communication devices 104 may comprise, for example, parts of a cellular telephone network or a WiFi hotspot.

The base stations 116 are generally in communication with one another through wireless or wireline connections. In addition, the base stations 116 are generally in communication with a wireless network server 124, either directly of via other base stations 116. The wireless network server 124 may perform a number of functions, such as interconnecting the base stations 116, and therefore mobile communications devices 104, with the public switched telephony network 128 and in turn with other communication devices 130. In accordance with further embodiments of the present invention, the wireless network server 124 may be interconnected with one or more client computers 108, such as general-purpose computers 108 running web browser software, through a computer network such as the Internet 132.

The system 100 may also include one or more secondary communication devices 136. In accordance with embodiments of the present invention, the secondary communication device 136 is a communication device or facility that is in the vicinity of and/or accessible to the user 112. Examples of secondary communication devices 136 include cellular telephones, land line telephones, soft telephones, instant messaging or email applications running on computers or PDAs, pagers, voice mail accounts, and answering machines.

Figure 2:
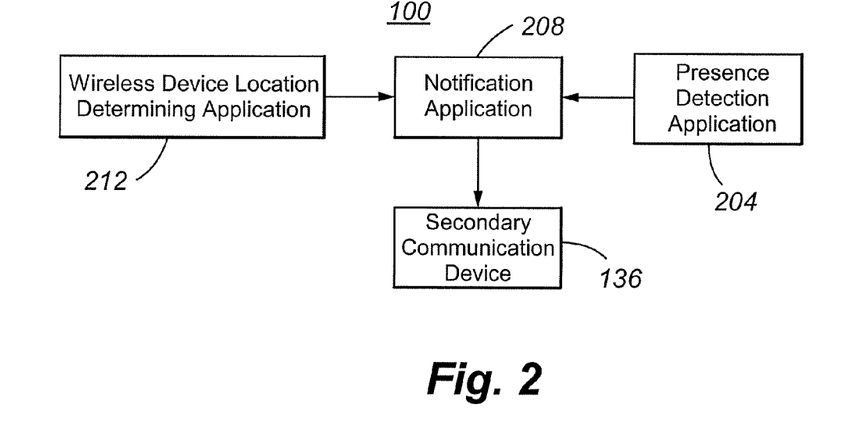
FIG. 2 is a block diagram of components of a notification system in accordance with embodiments of the present invention.

FIG. 2 is a block diagram of functional components of a notification system 100 in accordance with embodiments of the present invention. In particular, the functional components of the system 100 illustrated in FIG. 2 include a presence detection application 204, a notification application 208, and a wireless device 104 location determining application 212. In accordance with at least one embodiment of the present invention, the presence detection application 204, the notification application 208, and the wireless device 104 location determining application 212 are run on one or more general-purpose computers 108 and/or the wireless network server 124. Alternatively, it is within the scope of the invention to have one or more of these applications 204, 208, and 212 running in whole or in part on the mobile device 104. The wireless device 104 location determining application 212 is operable to acquire location information from appropriate sources. For example, through the execution of the location determining application 212 the wireless network server 124 knows the location of the mobile communication device 104 or can access location information related to the mobile device 104. The presence detection application 204 is operable to acquire presence information regarding the mobile communication device user 112. The notification application 208 is operable to receive information from both the location determining application 212 and the presence detection application 204 and to further communicate with the user 112 possibly through a secondary communication device 136. Although discussed as separate applications it can be appreciated by one of skill in the art from the present description that one or more of the applications 204, 208, 212 application functions can be combined into a lesser number of applications. In accordance with embodiments of the present invention, a secondary communication device 136 is used to communicate with the user 112 at times when the user has become separated from the mobile communications device 104.

The notification application 208 acquires information regarding the location of the mobile communication device 104 from the wireless device 104 location determining application 212. In accordance with embodiments of the present invention the wireless network server 124 runs the location determining application 212 and obtains the location information by determining an approximate location for the mobile communication device 104 based on the device's operation within a wireless communication cell 120 associated with a particular base station 116. In accordance with embodiments of the present invention, the location determining application 212 may use data obtained from a global positioning system or terrestrial triangulation techniques to provide more precise location information for the mobile communication device 104. Additionally, if the mobile communication device 104 employs the use of "blue tooth" technology or an 802.11 wireless interface, known techniques may be used to determine position. As a further example, a docking cradle that is connected to a computer with a known location could be used to determine position.

Presence information as used herein generally includes information pertaining to the location and/or availability of a person. As can be appreciated by one of skill in the art, presence information can be derived from location information concerning devices that are believed to be in the vicinity (or possibly in the vicinity) of the user 112. By way of example and not limitation, such information can include electronic events that provide information regarding the approximate physical location of a person or a device. Example of such events include placing a telephone call, logging into a network computer, swiping a credit card, or swiping an electronic identification badge. Information concerning the availability of a person, including the preferred method of contacting the person, can be inferred from electronic events associated with the person or can be explicitly stated. Additional resources for deriving presence information may include an electronic calendar including scheduling information for the person.

The presence detection application 204, the notification application 208, and the wireless device 104 location determining application 212 can be run on, for example, the general-purpose computer 108, the mobile communication device 104, and/or the wireless network server 124. In an example system 100 within the scope of the invention, an application comprising both a presence detection algorithm 204 and a notification algorithm 208 is executed on the mobile device 104 and can include the use of a heuristic algorithm to determine presence information. Such an algorithm can employ the use of an electronic scheduling calendar or other predictive means related to the location of the user 112 to determine whether the mobile communication device 104 is at an expected location.

As can be appreciated by one skilled in the art, location information for the mobile communication device 104 and the user 112 of the portable communication device 104 can differ. Differing location information can indicate separation between the communication device 104 and the user 112. By way of example, consider a situation in which a user 112 goes to his place of employment and inadvertently leaves his cellular telephone 104 at home. The cellular telephone 104 will remain in the wireless communication cell 120 whose base station 116 has a coverage area that includes the user's 112 house. Assuming the user's 112 place of employment is in a different wireless communication cell 120, the user 112 will generate presence information indicative of a different location as a result of either swiping a badge or logging onto a network computer at his or her place of employment. This differing location information indicates a separation between the cellular phone 104 and the user 112 of the cellular phone 104.

The notification application 208 uses the presence information for the user 112 provided by the presence detection application 204 and location information for the mobile communication device 104 provided by the location determining application 212 to, firstly, determine if the user 112 has become separated from the mobile communication device 104 and to, secondly, take steps to notify the user 112 of the separation. Continuing with the above example, a comparison of the location information for the cellular telephone 104 and the presence information for the cellular telephone user 112 reveals that they have become separated. The notification application 208 may then proceed to notify the user 112. In accordance with one embodiment of the present invention, the notification application 208 contains a configurable parameter corresponding to a maximum allowable distance of separation. In such an embodiment the notification application 104 would only proceed to notify the user 112 after first estimating a distance of separation and then comparing this distance with the maximum allowable distance.

In accordance with embodiments of the present invention, the notification application 208 is capable of notifying the user 112 of a separation between the mobile communication device 104 and the user 112 by means of secondary communication device 136. By way of example and not limitation, the secondary communication device 136 can be a pager, an office telephone, a network computer or a personal digital assistant. Various methods for notifying the user 112, each appropriate to a particular secondary communication device 136, are within the scope of the invention. For example, the notification application 208 could use a prerecorded voice message for notification on a telephone or voice mail, an instant message for notification on a personal digital assistant or network computer, an email message for notification on network computer or a text message for notification on a pager.

In accordance with embodiments of the present invention, the notification application 208 is capable of using the presence information associated with the user 112 to choose a method of communication most likely to result in a successful communication with the user 112. This choice may be the result of explicit contact information or may be inferred from presence information. For example, the presence detection application 204 may infer from detecting that the user 112 has logged onto his or her office network computer that it is likely that the user 112 can be reached through a secondary communication device 136 comprising the office computer or an office phone.

In accordance with embodiments of the present invention, the notification application 208 is capable of prompting the user 112 for a course of corrective action to be taken in response to a separation between the mobile communication device 104 and the user 112. For example, the notification application 208 may inform the user 112 that he or she has become separated from his or her portable communication device 104. The notification application 208 can then prompt the user 112 to provide a reason for the separation. For example, the notification application 208 can ask the user 112 if the mobile communication device 104 has been inadvertently left behind or perhaps stolen.

In accordance with embodiments of the present invention, the notification application 208 is capable of taking corrective action in response to the reason for separation supplied by the user 112. For example, if the user 112 reports that the mobile communication device has been stolen, the notification application 208 may report that the device has been stolen to a wireless network provider. Alternatively, if the device 104 has been inadvertently left behind, the notification application 208 may take a number of different corrective actions. For example, in the case of a cellular telephone, the notification application 208 may enable a prerecorded message that informs a caller that the user 112 is not currently available through the cellular phone 104. Alternatively, the notification application 208 may cause the cellular telephone 104 to forward calls to an alternative telephone associated with the user 112, such as an office telephone. The notification application may also send a signal to the mobile communication device 104 that shuts down and locks the device, thus rendering it unusable.

Alternatively, certain corrective actions may be taken without the need for prompting the user 112. For example, under some circumstances the user 112 may wish to have his or her calls automatically forwarded to an alternative communication device.

Figure 3:
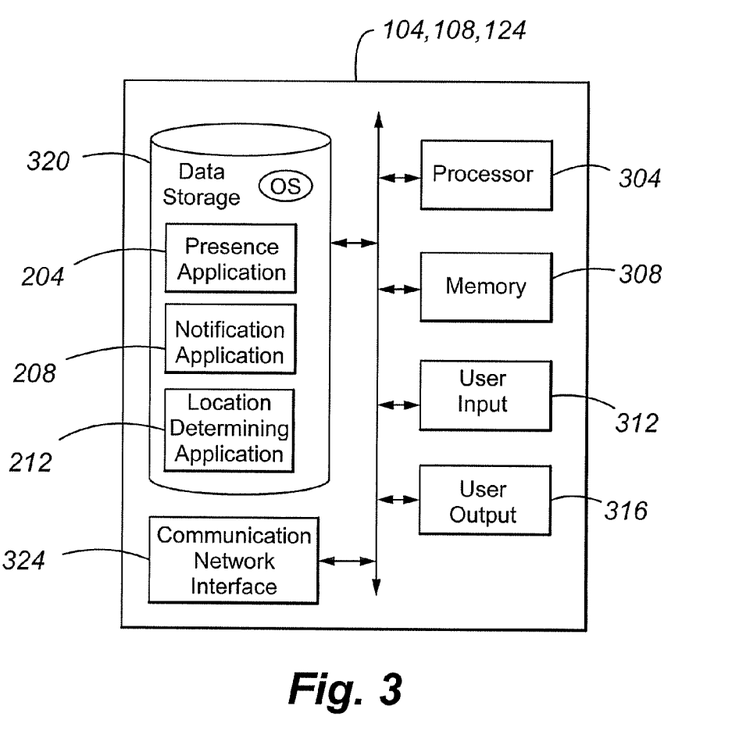
FIG. 3 is a schematic depiction of components of a device or computer in accordance with embodiments of the present invention.

With reference to FIG. 3, components of a mobile communication device 104, a general-purpose computer 108 and/or wireless network server 124 implementing some or all of the applications associated with the notification system 100 are depicted in block diagram form. The components may include a processor 304 capable of executing program instructions. Accordingly, the processor 304 may include any general-purpose programmable processor, digital signal processor (DSP) or controller for executing application programming. Alternatively, the processor 304 may comprise a specially configured application specific integrated circuit (ASIC). A processor 304 generally functions to run programming code implementing various functions performed by the general-purpose computer 108, including the presence detection application 204, the notification application 208, and the wireless device 104 location determining application 212 as described herein.

A general-purpose computer 108 or server 124 may additionally include memory 308 for use in connection with the execution of the programming by the processor 304 and for the temporary or long-term storage of data or program instructions. The memory 308 may comprise solid state memory resident, removable or remote in nature, such as DRAM and SDRAM. Where the processor 304 comprises a controller, the memory 308 may be integral to the processor 304.

In addition, the general-purpose computer 108 or server 124 may include one or more user inputs or means for receiving user input 312 and one or more user outputs or means for outputting 316. Examples of user inputs 312 include keyboards, keypads, touch screens, touch pads and microphones. Examples of user outputs 316 include speakers, display screens (including touch screens displays) and indicator lights. Furthermore, it can be appreciated by one of skill in the art that the user input 312 may be combined or operated in conjunction with the user output 316. An example of such integrated user input 312 and user output 316 is a touch screen display that can both represent visual information to a user and receive input selections from the user. In accordance with embodiments of the present inventions, a user input 312 and user output 316 associated with the general-purpose computer may be used by an administrator in connection with creating or loading instructions and other information related to the operation of the general-purpose computer 108.

A general-purpose computer 108 or wireless network server 124 may also include data storage 320 for the storage of application programming and/or data. The data storage may contain the presence detection application 204 instructions, the notification application 208 instructions, and/or the wireless device 104 location determining application 212 instructions. The data storage 320 may also store various wireless telephony network routing and support applications. Operating system software 340 may also be stored by the data storage 320. The data storage 320 may comprise, for example, a magnetic storage device, a solid state storage device, an optical storage device, a logical circuit, or any combination of any such devices. It should be appreciated that the programs and data that may be maintained in the data storage can comprise software, firmware or hardware logic, depending on the particular implementation of the data storage 320.

A computer 108 or server 124 may also include one or more network interfaces 324. In general, a network interface 324 interconnects the general-purpose computer 324 the public switched telephony network 128. A network interface 324 may also be provided to interconnect the general-purpose computer 108 to the wireless base stations 116. A network interface 324 may also interconnect the general-purpose computer to the Internet 132.

Figure 4:
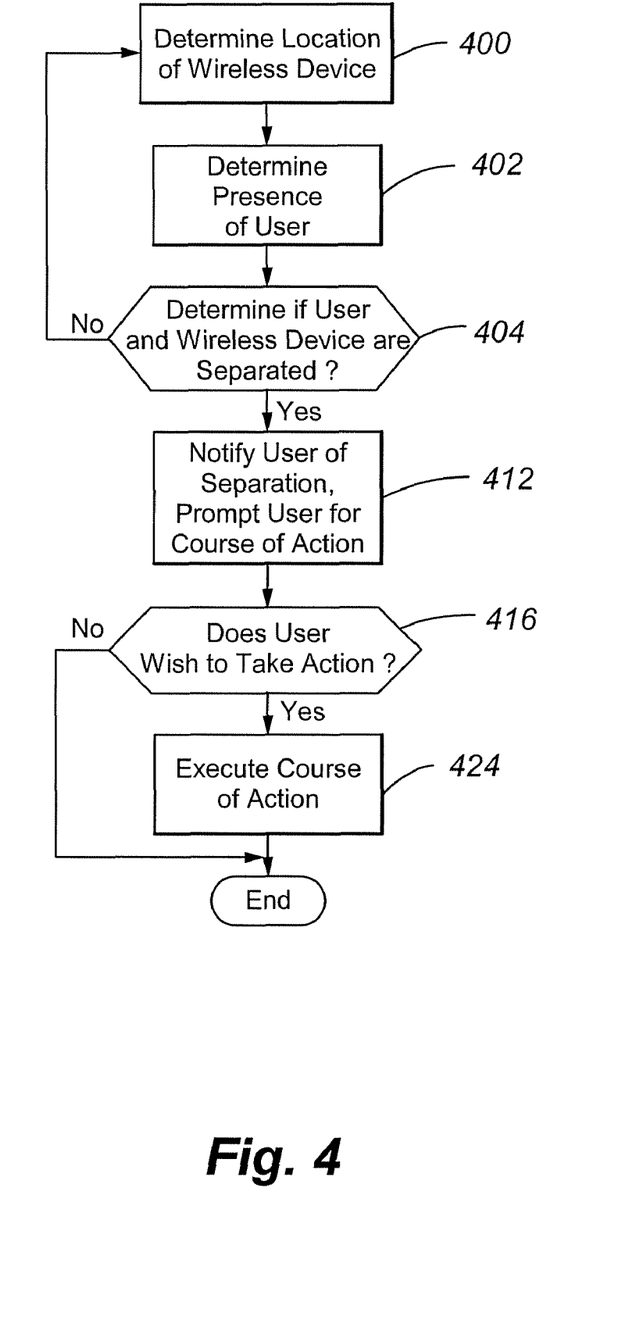
FIG. 4 is a flow chart depicting aspects of the operation of a notification method in accordance with embodiments of the present invention.

With reference to FIG. 4, aspects of the operation of a notification system 100 in accordance with embodiments of the present invention are illustrated. At step 400, location information for the mobile wireless device 104 is determined by the wireless device 104 location determining application 212. For example, in the case of a location determining application 212 running on the wireless network server 124 the wireless network cell or cells 120 in which the device 104 is active can be used to determine the location of the device 104. At step 402, the presence of the mobile wireless device user 112 is determined by the presence detection application 204. Examples of such presence information are listed above in connection with the discussion of FIG. 2. For instance, examples of presence information associated with the user 112 include the person's approximate physical location and currently availability, such as may be derived from being logged onto a network or scheduled to be at a particular location as shown in an electronic calendar.

At step 404, location information, provided by the location determining application 212, and presence information, provided by the presence detection application 204, are used by the notification application 208 to determine whether a separation exists between the mobile communication device 104 and the user 112. Firstly, location information for the mobile communication device 104 and location information derived from the presence information for the user 112 are compared to determine if a separation exists. In accordance with embodiments of the present invention, the presence detection application 204 allows for the mobile communication device 104 and the user 112 to be separated within a certain distance without proceeding to notify the user 112. This provides for the situation where, for example, the mobile communication device 104 is located in one room and the user 112 is operating a computer in a nearby room. As can be appreciated, it may not be the case that the user 112 would wish to be notified of separation at this point. Accordingly, embodiments of the present invention provide for a configurable parameter corresponding to a maximum allowable distance of separation. If at step 404 it is determined that a separation exists, operation proceeds to step 412. Otherwise, operation is returned to step 400, allowing presence information for the device 104 and the user 112 again to be collected and compared.

At step 412, the user 112 is notified that he or she has become separated from his or her mobile communication device 104. Examples of methods for achieving the notification are provided above in connection with the discussion on FIG. 2. For instance, the notification may be achieved by means of a prerecorded telephone call to an office of home telephone, an instant messaging service message to a computer, or other secondary communication device 136. The notification may additionally include a prompt for the user to provide information regarding reasons for the separation.

Embodiments of the present invention also provide for certain corrective actions to occur in response to the user's 112 response to the prompt for information regarding separation. Alternatively, certain corrective action may be taken without prompting the user for information. At step 416, a determination is made regarding whether the user 112 wishes the system 100 to take corrective action regarding the separation of the mobile communication device 104 and the user 112. If a corrective action needs to be taken, operation proceeds to step 420. If no corrective action needs to be taken, operation may end.

At step 424, corrective action in response to a separation between the portable communication device 104 and the mobile communication device user 112 is executed. Examples of such corrective action that are within the scope of the present invention are provided above in connection with the discussion of FIG. 2. For instance, the device 104 may be reported stolen or communication directed to the device may be redirected to an alternative communication device. After the corrective action in response to a separation is executed, the operation is allowed to end.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for notifying a person of a separation between the person and a cellular telephone, comprising:

a processor executing a notification application, a location determining application, and a presence application;

the notification application receiving physical location information for the cellular telephone from the location determining application;

the notification application receiving presence information from the presence application, wherein the presence information includes an approximate location for the person, wherein to generate the presence information the presence application:

receiving an electronic event;

determining that the electronic event pertains to the person;

determining an approximate physical location of the electronic event;

inferring that the person is located at the approximate physical location;

providing the approximate physical location as presence information;
the notification application comparing the physical location information for the cellular telephone and the approximate location for the person derived from the presence information;
the notification application determining if the physical location information for the cellular telephone and the approximate location for the person is different;
the notification application calculating the separation between the physical location information for the cellular telephone and the approximate location for the person;
the notification application comparing the separation to a predetermined distance;
when the separation is greater than the predetermined distance, the notification application determining that the person and the cellular telephone are separated; and
in response to determining that the person and the cellular telephone are separated, the notification application communicating with a secondary communication device to notify the person of the separation wherein the secondary communication device is in a vicinity of the person.

2. The method of claim 1 wherein the step of notifying is achieved by means of an electronic message sent to the secondary communication device associated with the person.

3. The method of claim 2, wherein the secondary communication device is chosen from a plurality of communications devices associated with the person, wherein the choice is made based on an analysis of the presence information for the person.

4. The method of claim 1, wherein the step of notifying the person of the separation is achieved by means of an electronic message sent to all communication devices associated with the person.

5. The method of claim 1, further comprising:
prompting the person for a course of action to be taken, wherein the course of action comprises at least one of:
a) reporting the cellular telephone stolen;
b) redirecting communications to an alternative communication device associated with the person;
c) enabling an unavailable message to be issued by the cellular telephone; and
d) sending a disable signal to the cellular telephone that causes the cellular telephone to shut down and lock.

6. The method of claim 1, wherein the predetermined distance is configurable and represents a maximum allowable distance of separation.

7. The method of claim 1, wherein the steps of determining physical location information for the cellular telephone and determining the approximate physical location for the person are performed by applications external to the cellular telephone.

8. The method of claim 1, wherein the steps of determining physical location information for the cellular telephone and determining the approximate physical location for the person are performed by applications internal to the cellular telephone.

9. The method of claim 8, wherein the presence detection application includes a heuristic algorithm.

10. A notification system, comprising:
a wireless device associated with a person;
a location determining application configured to determine the GPS location of the wireless device using a GPS system of the wireless device;
a presence detection application configured to:
  receive an electronic event;
  determine that the electronic event pertains to the person;
  determine an approximate physical location of the electronic event;
  infer that the person is located at the approximate physical location;
  provide the approximate physical location as presence information; and
a notification application configured to:
  acquire location information for the wireless device from the location determining application;
  acquire the approximate physical location for the person from the presence detection application;
  determine if the physical location information for the cellular telephone and the approximate location for the person is different;
  calculate a distance of the separation between the physical location information for the cellular telephone and the approximate location for the person;
  compare the separation to a predetermined distance;
  when the separation is greater than the predetermined distance, determine that the wireless device has become separated from the person; and
  communicate with a secondary communication device to notify the person of the separation.

11. The notification system of claim 10, wherein the notification application is configured to notify the person by an electronic communication sent to the secondary communication device associated with the person.

12. The system of claim 11, wherein the secondary communication device is chosen from a plurality of communications devices associated with the person, wherein the choice is made based on an analysis of the presence information for the person.

13. The system of claim 10, wherein the notification application is configured to notify the person of the separation by means of an electronic message sent to all communication devices associated with the person.

14. The notification system of claim 10, wherein the notification application is configured to prompt the person for a course of action and executing the course of action, wherein the course of action comprises at least one of:
a) reporting wireless device stolen;
b) redirecting communications to an alternative communication device associated with the person; and
c) enabling an unavailable message to be issued by the wireless device.

15. The method of claim 10, wherein the notification application is configured to calculate the distance of separation based on the GPS location information for the wireless device and the approximate physical location for the person, and wherein the predetermined distance is a configurable parameter, wherein the configurable parameter represents a maximum allowable distance of separation.

16. The system of claim 10, wherein the notification application and the presence detection application are external to the wireless device.

17. The system of claim 10, wherein the notification application and the presence detection application are internal to the wireless device.

18. The system of claim 17, wherein the presence detection application comprises a heuristic algorithm.

19. A notification system, comprising:
a memory operable to store computer executable instructions;

a processor in communication with the memory, the processor configured to execute the computer executable instructions, wherein the computer-executable instructions cause the processor to execute a method for notifying a user of a separation between the user and a mobile device, the computer executable instructions comprising:

instructions for providing wireless communication with a cellular telephone;

instructions for determining a GPS location information for the cellular telephone;

instructions for receiving an electronic event;

instructions for determining that the electronic event pertains to the person;

instructions for determining an approximate physical location of the electronic event;

instructions for inferring that the person is located at the approximate physical location;

instructions for providing the approximate physical location as presence information;

instructions for determining if the physical location information for the cellular telephone and the approximate location for the person is different;

instructions for calculating a distance of the separation between the physical location information for the cellular telephone and the approximate location for the person;

instructions for comparing the distance of the separation to a predetermined distance;

when the separation is greater than the predetermined distance, instructions for determining that a separation exists between the cellular telephone; and instructions for communicating with a secondary communication device to notify the user of the separation.

20. The notification system of claim 19, wherein the secondary communication device comprises a communication device other than the cellular telephone.

* * * * *